(12) United States Patent
Hughes, Jr. et al.

(10) Patent No.: US 8,095,453 B2
(45) Date of Patent: Jan. 10, 2012

(54) ORDER CHRONICLE PROCESS AND METHOD

(75) Inventors: John T. Hughes, Jr., Stratford, CT (US);
Daniel F. Moore, New Haven, CT (US);
Bruce E. Friedman, Monroe, CT (US);
Timothy Vincent, Shelton, CT (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 0 days.

(21) Appl. No.: 12/911,907

(22) Filed: Oct. 26, 2010

(65) Prior Publication Data

US 2011/0040676 A1   Feb. 17, 2011

Related U.S. Application Data

(63) Continuation of application No. 10/206,789, filed on Jul. 25, 2002, now abandoned.

(60) Provisional application No. 60/385,988, filed on Jun. 5, 2002, provisional application No. 60/385,979, filed on Jun. 5, 2002.

(51) Int. Cl.
*G06Q 40/00* (2006.01)

(52) U.S. Cl. .......................................................... 705/37
(58) Field of Classification Search ...................... 705/37
See application file for complete search history.

(56) References Cited

U.S. PATENT DOCUMENTS

| | | | |
|---|---|---|---|
| 3,581,072 A * | 5/1971 | Nymeyer ......................... | 705/37 |
| 4,903,201 A * | 2/1990 | Wagner ........................... | 705/37 |
| 5,077,665 A * | 12/1991 | Silverman et al. .............. | 705/37 |
| 6,505,175 B1 * | 1/2003 | Silverman et al. .......... | 705/36 R |
| 6,618,707 B1 * | 9/2003 | Gary ........................... | 705/36 R |
| 7,110,975 B2 * | 9/2006 | Marks de Chabris et al. .. | 705/37 |
| 7,610,235 B2 * | 10/2009 | Lutnick et al. ................. | 705/37 |
| 2001/0042041 A1 * | 11/2001 | Moshal et al. ................ | 705/37 |
| 2001/0049650 A1 * | 12/2001 | Moshal et al. ................ | 705/37 |
| 2002/0099641 A1 * | 7/2002 | Mills et al. ..................... | 705/37 |
| 2003/0005251 A1 * | 1/2003 | Wilson et al. ................. | 711/167 |

* cited by examiner

*Primary Examiner* — Jagdish Patel
*Assistant Examiner* — Kenneth Bartley
(74) *Attorney, Agent, or Firm* — Nixon & Vanderhye P.C.

(57) ABSTRACT

A process for chronicling a portion of an electronic market includes a record process for recording an activity relating to a security interest in an order book in main memory of a computer system and another record process for recording the activity in a persistent store.

36 Claims, 3 Drawing Sheets

ORDER CHRONICLE PROCESS AND METHOD

RELATED APPLICATIONS

This application is a continuation and claims priority from U.S. patent application Ser. No. 10/206,789, filed Jul. 25, 2002, which claims priority from U.S. Provisional Patent Application No. 60/385,988, entitled "Security Processor", filed on Jun. 5, 2002 and to U.S. Provisional Patent Application No. 60/385,979, entitled "Supermontage Architecture", filed on Jun. 5, 2002.

BACKGROUND

This invention relates to electronic securities trading, and the processing and displaying of information relating to electronic securities trading.

Electronic equity markets, such as The Nasdaq Stock Market™ collect, aggregate, and display pre-trade information to market makers. In The Nasdaq Stock Market™, for example, this pre-trade information can take the form of a quote that represents a single or an aggregate of same-priced principal or agency orders. A market, such as The Nasdaq Stock Market™ also provides trading platforms through which market participants may trade securities in the marketplace.

SUMMARY

According to an aspect of this invention, a process for chronicling a portion of an electronic market includes a record process for recording an activity relating to a security interest in an order book in main memory of a computer system and another record process for recording the activity in a persistent store.

According to a further aspect of the invention, a method for chronicling a portion of an electronic market includes recording an activity relating to a security interest in an order book in main memory of a computer system and recording the activity in a persistent store.

According to a further aspect of the invention, a computer program product residing on a computer readable medium for chronicling a portion of an electronic market includes instructions for causing a computer to record an activity relating to a security interest in an order book in main memory of a computer system, and to record the activity in a persistent store.

One or more of the following features may also be included.

The main memory may be random access memory. The main memory may be a cache. The first activity may be recorded in the main memory and in the persistent store prior to recording a second activity. The first activity may be recorded in the order book and in the persistent store within a number of clock cycles. The main memory may be separate from the persistent store. The persistent store may be a sequential storage device. The persistent store may be a hard disk drive. The first activity may include matching a security transaction against a portion of the security interest. The first activity may include executing a security transaction against a portion of the security interest. The persistent store may be used to rebuild the order book. The state of the order book may represent the existing market at the time of the first activity.

One or more advantages can be provided from the above. By storing, for example, received orders, quotes, or other security information in an order book residing in random access memory, processing time decreases while throughput substantially increases. Further, by recording the securities activities in a hard disk file nearly simultaneously with executing the activities, a complete record of the executed activities is created. Thus, the order book may be quickly rebuilt from the security activities recorded in the hard disk file. Additionally, by storing the activities in the hard disk file, the rebuilt order book will continue to represent the existing state of the market after an emergency such as a system malfunction. By providing reliable backup to the securities information stored in the random access memory resident order book, a trading slow down due to an emergency is reduced.

DETAILED DESCRIPTION

Figure 1:
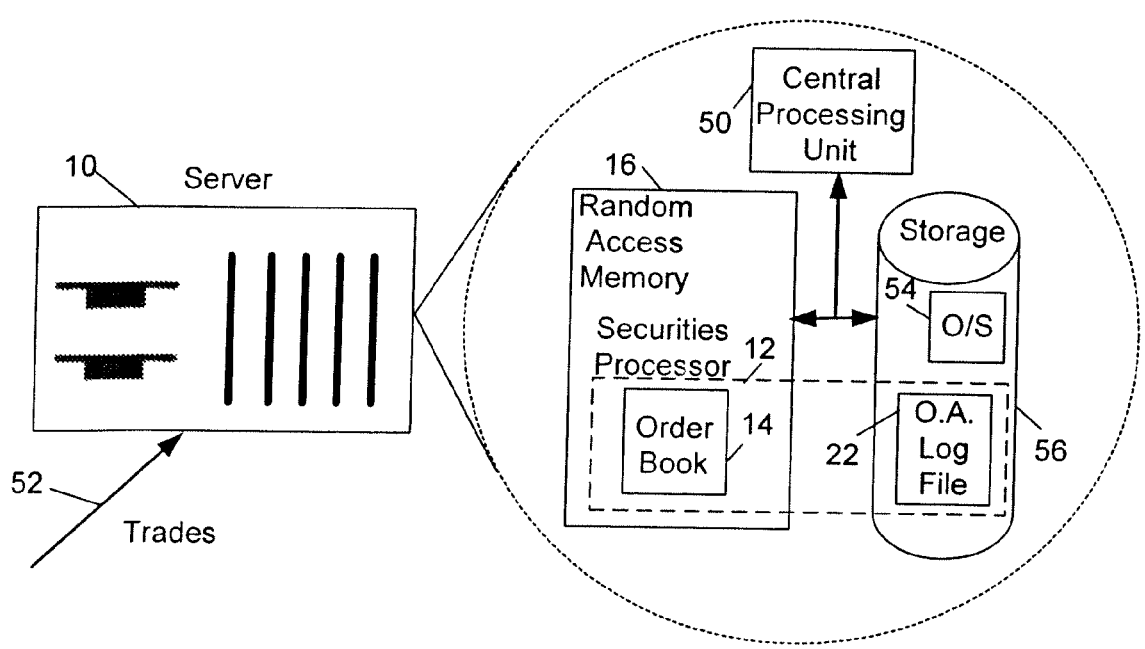
FIG. 1 is a block diagram of a server.

Referring to FIG. 1, a server 10 is shown that includes a securities processor 12 that stores securities trade information in an order book 14 that resides in random access memory 16 and an order activity log file 22 stored in server storage 56. The securities processor 12 is one portion of a computerized trading system, which trades securities electronically by processing one-sided or two-sided transactions entered by a user (e.g., a market participant). Users typically access and use the computerized trading system via a computer, thus allowing the users to enter security trades themselves or through professional traders/brokers. A central processing unit (CPU) 50 processes the trades, received over network 52, by executing instructions stored in an operating system (O/S) 54, along with other instructions, which are stored in the server storage 56. In some implementations, the server storage 56 may be hard disk drive, a tape drive, an optical drive, a redundant array of independent disks (RAID), a random access memory (RAM), or a read-only memory (ROM), for example, or other similar sequential access storage device or devices that provides a persistent store of the recorded information. Typically, server 10 is a multi-processing, fault-tolerant system that includes multiple central processing units that each have a dedicated main memory system, in this implementation random access memory 16, or share a common main memory pool. While being executed by the central processing unit(s) of server 10, multiple instantiations of securities processor 12 may reside in the main memory system of server 10. Further, the processes and subroutines of securities processor 12 may also be present in various levels of cache memory incorporated into server 10.

Figure 2:
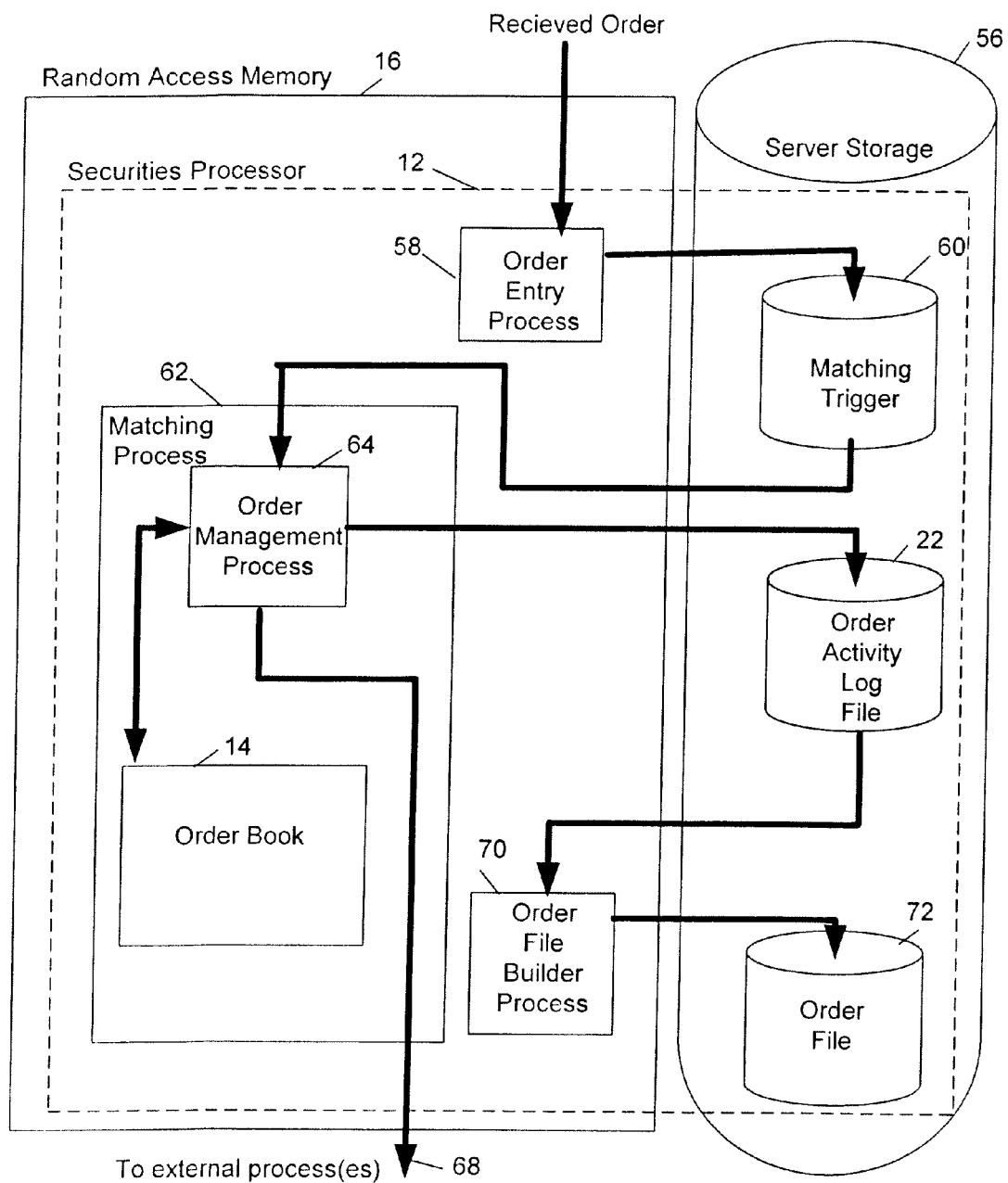
FIG. 2 is a block diagram of random access memory and a server storage.

Referring to FIG. 2, the server storage 56 and the securities processor 12 residing in the random access memory 16 is shown. For example, to perform a trade for a particular security, a user enters an order into the computerized trading system that is received and directed to the securities processor 12 assigned to the particular security. In some implementations, the securities processor 12 may be assigned to two or more securities in order to distribute the volume of securities trading over a number of securities processors (not shown). In other implementations the securities processor 12 may be assigned to one heavily traded, high volume security to reduce trading volume of that security on other securities processors.

The securities processor 12 may be assigned to one particular security and store related security trading interest in the order book 14 residing in the random access memory 16 of that securities processor 12. By random access memory is meant main memory or alternatively one or more levels of cache memory. In some implementations a matching process may load portions of the order book into a level of cache memory from the main memory. Alternatively, the securities processor 12 may be assigned to multiple securities and correspondingly, the order book 14 residing in random access memory 16 of that securities processor stores the trading interests of those multiple securities. In some implementations, to store interests for multiple securities, the order book 14 in random access memory 16 may be partitioned into multiple sections, dimensions, or files to store the interests assigned to the securities processor 12. Here the order book 14 resides within the execution space of the random access memory 16 that has the matching process 62. However, in some implementations the order book 14 resides in an execution space of the random access memory 16 that is separate from another execution space having the matching process 62. Also, the order book 14 is exclusively accessible by the matching process 62 regardless whether or not both reside in the same execution space of the random access memory 16.

In addition to the support for a horizontally scalable architecture, the in memory order book 14 provides for reliable transaction processing at extremely high rates for an individual security. The internal state of the securities processor 12 is adjusted by processing incoming transactions in strict first-in, first-out serial sequence. The transaction rates capable for this approach exceeds those rates provided by traditional file based approaches and provide a reliable approach to use the order book 14 in random access memory 16 to hold the state of the book. By inserting, updating, and retrieving elements (records) from the in-memory order book 14 instead of a disk file, throughput substantially increases. Also, logic for allocating and freeing memory, maintaining lists and index tables associated with the in-memory order book 14 may be encapsulated random access memory 16.

In general, an order directed to the securities processor 12 is received by an order entry process 58 that performs cursory checking functions (e.g., order eligibility, order syntax, etc.) on the received order. If the received order fails one or more of the cursory functions the order is returned to the user, however, if the cursory functions are passed, the received order is logged in a matching trigger 60. The matching trigger 60 queues the received order along with, for example, other orders, quotes, deliveries, or supervisory commands that are received by the securities processor 12 for the security or securities assigned to the securities processor. Typically the received order represents a new order for processing (e.g., match against open orders, add as new open orders, etc.) while the supervisory commands, for example may cancel, modify, or execute other similar actions against existing orders stored in the order book 14 residing in random access memory 16.

Once queued into the matching trigger 60, the received order is held in the matching trigger until pulled into a matching process 62 by an order management process 64. The matching process 62 matches portions of the received order, i.e., executes and allocates the received orders and stores the unmatched portion of the order stored in the order book 14. After pulling the received order, which is at least partially marketable and has cleared initial validations, the matching process 62 attempts to execute all or part of the received order with one or more orders on the contra side of the order book 14. Upon pulling the received order, the matching process 62 checks and validates the received order (e.g., marketability check, apply short sale rule, etc.) with definite and unambiguous knowledge of the current state of the market for the particular security. Some of the validations are specific to orders received while some validations are specific for quotes received, by the securities processor 12 or are common to quotes and orders. In this particular example the security processor 12 received an order and if the check or validation fails the received order is returned to the user unexecuted.

One factor that is considered by the matching process 62 is the quantity of the received order. Matching the received order continues until the entire received, marketable order is exhausted. In executing the received order to the fullest extent, the display size of the received order, as well as the reserve size, if any, are combined and matching process 62 continues to execute this combined quantity of the received order against contra side orders stored in the order book 14 until exhaustion of the received order. To match against orders stored in the order book 14, the stored orders have an open status and are on the opposite side of the market to that of the received order. Once the received order is completely exhausted, the matching process 62 is complete and the execution is reported to other processes internal and external to the securities processor 12.

Another factor concerning the matching process 62 is the marketability of the received order. After passing the previous validations during the order entry process 58, the matching process 62 determines whether the received order is marketable. The received order is marketable if the order is a limit or other type of priced order and the received order's price locks or crosses the inside for the particular security. For a received order which is a bid, the inside is locked or crossed if the bid price is higher than the current best (i.e., lowest) ask price; alternatively, for a received order which is an ask order, the inside is locked or crossed if the ask order price is lower than the current best (i.e., highest) bid price. The received order can also be marketable if it is a market type order.

Subsequently, if the order is marketable, further validations are performed using current inside market prior to retrieving an order stored in the order book 14 to match against. However, if after the received order is determined marketable and the subsequent matching of the received order against the orders retrieved from the order book 14, the inside spread changes which may result in the price of the received order not locking or crossing the market that occurrence could end the matching process 62. Also, if the received order, or a portion of the received order, is not marketable or not fully executable, the remainder is added to the order book 14 for matching to a future order received by the securities processor 12.

After the received order is determined marketable and subsequent validations based on current inside market are passed, the order management process 64 searches contra-side orders stored in the order book 14 that correspond to the particular security of the received order. To search the orders stored in the order book 14, the order management process 64 may use parameters associated with the received order. In some implementations, one parameter associated with the received order is the market participant ID that may be passed to the order management process 64 as a search parameter. By searching with the market participant ID, internalization, preferenced orders, or regular matching may be performed by the order management process 64. A matching preference may also be associated with the received order. For example, the received order may specify a matching condition that causes the matching algorithm to match based on a price/time priority, a price/fee/time priority, a price/size priority, or other preference. Also, the order management process 64 checks that a retrieved order from the order book 14 is available for matching (e.g., it is not in outage, etc.).

To initiate matching the received order, the matching process 62 determines the total quantities that can be executed in the current matching cycle. The quantities are, for example, the total executable display quantity for market participants non-unlisted trading privileges (non-UTPs), the total executable reserve quantity for non-UTPs, and the total executable UTP quantity. The UTP quantity is segregated in some embodiments because the UTPs are allocated against only after all the display quantities and reserve quantities for non-UTPs at a particular price level are exhausted. These quantities are used to determine how much quantity from the display and reserve size of a retrieved order may be used in a match and whether a retrieved UTP order can be filled. Once the total executable quantities are defined, the orders for allocation retrieved from the order book 14 in accordance with the appropriate prioritization algorithm and the use of internalization.

The order management process 64 retrieves the next order from the order book 14 and determines if the retrieved order meets the execution preference and requirements of the current match. For example, if a received order is specified with a prioritization preference of price/fee/time priority, and order management process 64 retrieves an order from the order book 14 with fees, then this retrieved order is skipped. The order management process 64 continues to look for orders at a price level until an order that does not have access fees is found. If the order of this type is not found, the order management process 64 starts over and retrieves orders from the order book 14 that charge fees. After all orders residing in the order book 14, at a price level that meet the specified requirements for the match are exhausted, the matching cycle continues at the next price level provided the market is still crossed.

To execute a match between the received order and the order retrieved from the order book 14, the order management process 64 determines if the match, for example, is an automatic execution, an odd lot, or a delivery and assigns the appropriate execution type to the execution. After matching the received order, the order management process 64 updates the retrieved order in the order book 14. For example, the retrieved order may be completely exhausted and updated as 'executed' or, in another example, the retrieved order may have been partially executed and the remainder of the order is stored in the order book 14 with an open status. Also, during the matching of the received order, as the displayed size is exhausted, orders can be replenished from the reserve size. As portions of the received orders are matched by orders on the order book 14, the order management process 64 updates the order book 14 to reflect the matches. The order management process 64 also checks if the received order should be refreshed. If the order is refreshed and the market is still crossed, the order management process 64 continues matching. Otherwise, the order management process 64 completes by reporting the portion executed to other processes included in the securities processor 12 and external 68 to the securities processor.

In some implementations matching process 62 includes a looping function that is triggered when the received order is identified as being executable. The matching process 62 would attempt to match a portion of the received order and continues matching the received order as long as the received quantity is greater than zero and the market is still crossed. If either of these conditions fails, then the matching process 62 is completed and executions are reported to processes internal and external to the securities processor 12.

During operations of the securities processor 12, the order book 14 is only accessible by the matching process 62, which serves as an interface and the single point of access to the order book. By restricting access of the order book 14 to the matching process 62, other processes included in or related to the securities processor 12 do no interfere with operations of the order book 14. For example, in some computerized trading systems an order book may, for example, be scanned to provide securities information to users during the same time period as the orders are retrieved from the order book to match a received order. Interruptions, such as this, which allow access and sharing of the order book between the matching process 62 and other lower priority processes slows the matching process and reduces trading efficiency. Also, by restricting access to the order book 14, securities information throughput significantly increases. Thus, by isolating the order book 14 to interact with only the matching process 62, matching speed and efficiency increases.

Besides receiving and processing an order, other activities related to the security or securities assigned to the securities processor 12 may be received. For example, a quote update may be received by the securities processor 12 and pulled from the matching trigger 60 by the matching process 62 for adding the quote in the order book 14 or preparing the quote for matching. If the received quote does not lock or cross the market, the order book 14 is updated by replacing an existing quote or adding the received quote as an initial quote. In another example, a two-sided quote may be received by the security processor 12 and pulled from the matching trigger 60 by the matching process 62. The side of the quote that does not lock or cross the market updates an existing quote or adds the quote as an initially received quote in the order book 14. The quote side that locks or crosses the inside is matched by the matching process 62 and any remainder will be added to the order book 14. Also, the marketable side of a received quote is removed from the order book 14 and replaced by any remainder after matching. A received quote may also be a relative update (e.g., a size increment or a size decrement) in which the matching process 62 adjusts the existing quote in the order book 14 for the relative size changes.

Supervisory commands (e.g., closing positions for a specific market participant, blocking a market participant's positions from being opened during the market opening process, purging a market participant's orders, or other similar command, etc.) may also be received by the securities processor 12 and pulled from the matching trigger 60 by the matching process 62. However, supervisory commands transactions are complete, inclusive, and are implemented as modular plug-in components.

After matching, for example, the received order, or a portion of a received order, against one or more orders in the order book 14 and prior to pulling the next activity order from the matching trigger 60, the order management process 64 reports the matching of the received order, or a portion of the received order, to the order activity log file 22 located in the server storage 56. Since the order activity log file 22 receives the report from the order management process 64 prior to pulling the next order from the order trigger 60, the order activity log file has the current status of the order book 14, and thus the current status of the market before any further processing. Thus, if an unforeseen catastrophe occurs, such as losing the information contained in the order book 14, the order book may be rebuilt based on the information backed-up in order activity log file 22.

Besides reporting the execution of the received order or a portion of the received order, the order management process 64 may report, for example, executing a delivery order, executing an odd-lot order, adding a quote, canceling an order, canceling/replacing an order, purging an order, updating the order book 14 to reflect executions or adding an unmatched received order or a portion of the received order, or other similar activity associated to the securities processor 12. Also, in some implementations the order activity log file 22 may, for example, be a data file, a database, or other data storage structure residing in server storage 56. Once stored in the order activity log file 22, the activities may be disseminated, for example, to trade participants, an Automated Confirmation Transaction (ACT) system, other interested parties, or processes internal or external to the securities processor 12.

In particular, one process associated with the securities processor 12, which accesses the activities stored in the order activity log file 22 is an order file builder process 70. The order file builder process 70 constructs an order file 72 that provides near real-time disaster recovery of the order book 14 for a number of potential failure scenarios, as well as the contingent redeployment of activity processing to secondary securities processors (not shown). Each potential failure point in the trading system is supported by a level of redundancy, ranging from immediate system-level backup to delayed manual takeover. In the interest of rapid recovery for virtually all failures, a degree of automatic processing is allowed, but in general manual intervention is always an option. At lower failure levels, for example the failure of the securities processor 12, the securities processor is attempted to be restarted. As failure severity increases, such as the loss of the CPU 50 (shown in FIG. 1), the level of automation employed decreases. Ultimately, the most serious catastrophic failure, such as a loss of the entire server 12, may permit little automatic recovery.

To provide disaster recovery, the order file builder process 70 builds and maintains the order file 72 by retrieving the activities stored in the order activity log file 22. In some implementations, the order file 72 is stored on the server storage 56 and has the latest updates for open orders or orders with a special status (e.g., the market participant requests closing their positions due to equipment trouble, a display and reserve quantity are zero but the delivery quantity is greater that zero, etc.). While the order file builder process 70 stores activities related to updating the order book 14, activities not needed for reconstructing the order book 14, such as executed or canceling orders, are filtered from the material stored in the order file 72. By storing these activities, the order file 72 provides the current status of the security interests residing in the order book 14 to provide fast recovery after in the event of a malfunction of the securities processor 12 or reassigning one or more securities to another security processor.

As mentioned, since the order book 14 resides in random access memory 16 such as main memory and in some implementations is accessed only by the matching process. In main memory information may be quickly stored on the order book as compared, for example, to order books residing in a magnetic medium (e.g., diskette, hard disk, etc.) which typically have much longer access times for storing and retrieving orders. Due to the fast accessibility of the random access memory 16, the order book 14 may be quickly rebuilt by retrieving information stored in the order file 72, as compared to rebuilding order books stored on a slower access hard disk or other magnetic medium.

Figure 3:
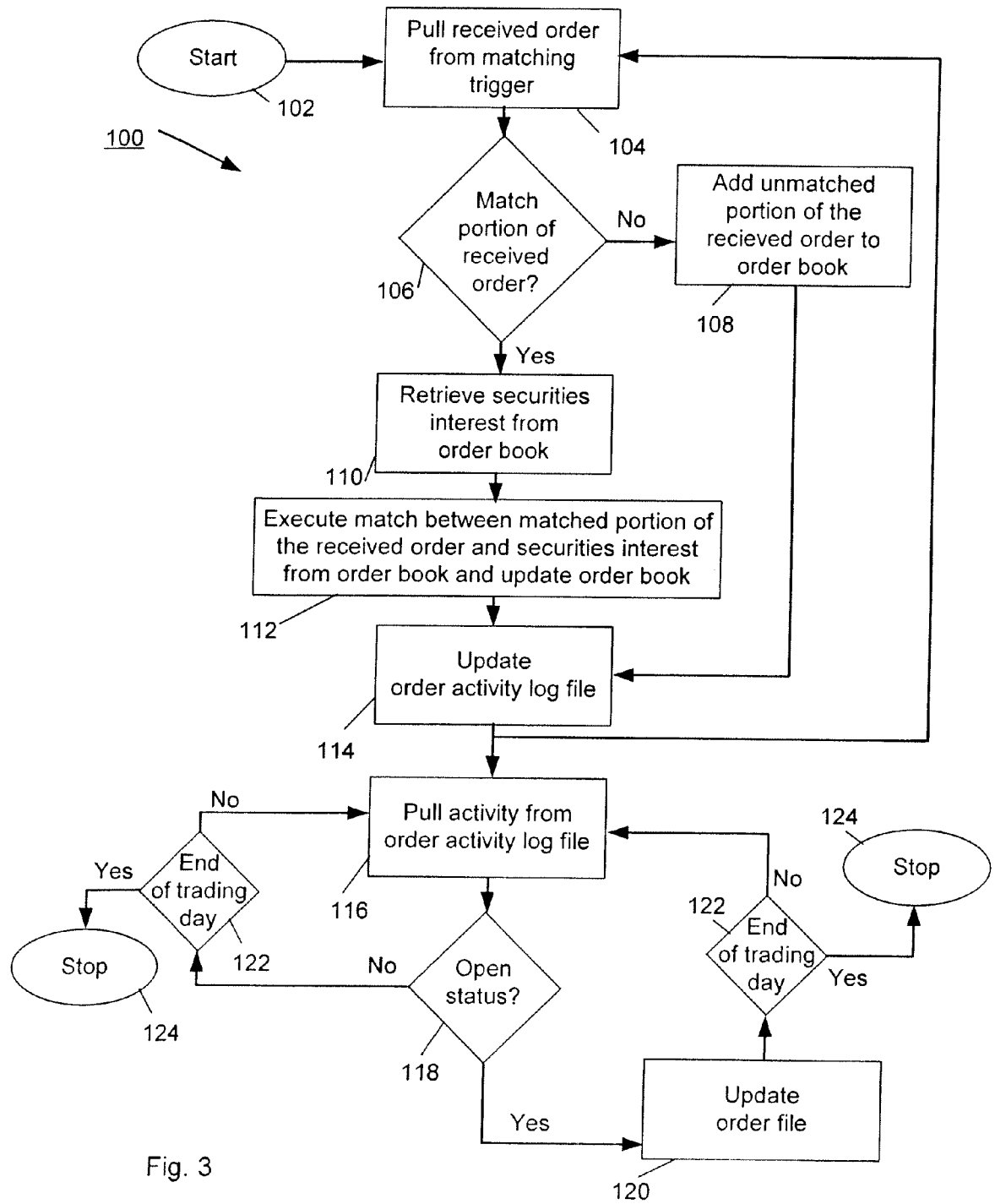
FIG. 3 is a flow chart for using a random access memory resident order book.

Referring to FIG. 3, a procedure 100 for using an order book residing in random access memory is shown. The procedure 100 starts 102 by pulling 104, for example, a particular security order from the matching trigger 60 (shown in FIG. 2) included in the securities processor 12 that is assigned to the security and determining 106 if a portion of the received order may be matched. If the procedure 100 determines 106 that a portion of the received order can be matched, the procedure 100 retrieves 110 a security trading interest on the opposite side of the market from the order book 14 (also shown in FIG. 2) in the random access memory 16 (also shown in FIG. 2). After retrieving 110 the security interest from the order book 14, the procedure 100 executes 112 the match between the portion of the received order and the retrieved security interest from the order book and updates the order book to reflect the match. If the procedure 100 determines 106 that a portion of received order can not be matched to any security interest residing on the order book 14, the procedure 100 adds 108 the portion of the received order to the order book for potential matching with orders received in the future. The order book 14 in memory is emptied at the end of each trading day, so orders received at the start of the next trading day are often added to the order book.

After executing 112 a portion of the received order or adding 108 a portion of the received order to the order book 14, the procedure 100 updates 114 the order activity log file 22 (also shown in FIG. 2) with an activity report relating to the received order. The order activity log file 22 is updated prior to pulling the next received order, or other activity, from the matching trigger 60. By updating the order book 14 and the order activity log file 22 prior to processing further activities, a complete and current listing of the activities executed by the securities processor 12 is contained in the order activity log file 22. Thus, by recording the activities in both locations at nearly the same time assures that the order book 14 may be rebuilt from the activities stored in the order activity log file 22 if, for example, a malfunction disables the random access memory 16.

After updating 114 the order activity log file 22, the procedure 100 returns to pull 104 the next received order, or other activity, from the matching trigger 60. Also after updating 114 the order activity log file 22, the procedure 100 pulls 116 the newly entered activity report from the order activity log file 22 while concurrently returning to pull 104 the next received order. After pulling 116 the newly entered activity report from the order activity log file 22, the procedure 100 determines 118 if the security interest corresponding to the activity report has an open status. If the status is open, the order file 72 (also shown in FIG. 2) is updated 120 with the activity and the procedure 100 determines 122 if the trading day has ended. If the trading day has ended, the procedure 100 stops 124, but if the trading day has not ended, the procedure 100 returns to pulling 116 the next received order, or other activity, entered into order activity log file 22. However, if the status of the interest is not open, the order file 72 is not updated since an interest with, for example, a closed status is not relevant to rebuilding the order book 14 and the procedure 100 determines 122 if the trading day has ended. Again, if the trading day has ended, the procedure stops 124, however, if the trading day has not ended, the procedure 100 returns to pull 116 the next activity report entered into the order activity log 22.

Although some implementations have been described, other implementations are also within the scope of the following claims.

In FIG. 1-3, to assure rebuilding of the order book 14, a received order, or a portion of a received order, is stored in the order book 14 and in the order activity log file 22 prior to pulling the next activity from the matching trigger 60. However, in some implementations, to assure rebuilding of the order book 14, the received order, or the portion of the received order, may be stored in the order book and in the order activity log file 22 within a particular time period, a particular number of clock cycles, or other similar timing process. Once the time period expires, the next activity may be pulled from the matching trigger 60 for processing by the matching process 62. By recording orders and other activities related to the order book 14 in a relatively short time period or for example, prior to processing the next entry in the matching trigger 60, the order book may be quickly rebuilt after numerous potential failure scenarios, as well as contingent redeployment of processing to secondary securities processors.

The order book described herein is not limited to the software embodiment described above; it may find applicability in any computing or processing environment. The order book may be implemented in hardware, software, or a combination of the two. For example, the order book may be implemented using circuitry, such as one or more of programmable logic (e.g., an ASIC), logic gates, a processor, and a memory.

The order book may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the order book. The order book may also be implemented as a machine-readable storage medium, configured with a computer program, where, upon execution, instructions in the computer program cause a machine to operate to perform the functions of the order book described above.

Embodiments of the order book may be used in a variety of applications. Although the order book is not limited in this respect, the order book may be implemented with memory devices in microcontrollers, general purpose microprocessors, digital signal processors (DSPs), reduced instruction-set computing (RISC), and complex instruction-set computing (CISC), among other electronic components.

Embodiments of the order book may also be implemented using integrated circuit blocks referred to as core memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A computer system for chronicling order execution in an order book maintained in an electronic market, the system comprises:
   a processor;
   a persistent storage medium storing an order activity log file;
   main memory coupled to the processor, the main memory storing
      an order book that stores orders for at least one security that is traded on the electronic market; and
   computer instructions for matching incoming orders against entries in the order book, the computer instructions comprising instructions to:
      store received incoming orders and other commands in addition to incoming orders, referred to as activities into a matching trigger queue;
      retrieve a next incoming order from the matching trigger queue and retrieve a record of an order from the order book stored in main memory;
      match the retrieved next incoming order and retrieved record from the order book;
      record match of the retrieved next incoming order and retrieved record from the order book in the order book in the main memory of the computer system; and
   record the match in the persistent storage medium in the order activity log file, prior to retrieving a subsequent activity from the activities from the matching trigger queue.

2. The computer system of claim 1 wherein the main memory is random access memory.

3. The computer system of claim 1 wherein the main memory is a cache portion of main memory.

4. The computer system of claim 1 wherein the received order or a portion of the received order is stored in the order book and in the order activity log file within a particular time period and upon expiration of the time period, a first activity is retrieved from the matching trigger queue for processing by the matching.

5. The computer system of claim 4 wherein the first activity includes instructions to execute a security transaction by matching the retrieved next incoming order and retrieved record from the order book.

6. The computer system of claim 4 wherein the first activity includes instructions to execute supervisory command related to a security transaction.

7. The computer system of claim 4 wherein a state of the order book represents the market at a time of the first activity.

8. The computer system of claim 1 further comprising instructions to:
   update an order file stored in the persistent store with the order.

9. The computer system of claim 1 wherein the computer instructions further comprises instructions to:
   determine a status of the order, if the status of the order is open,
   update an order file stored in the persistent store with the order; if the status is closed
   avoid update of the order file with the order.

10. The computer system of claim 1 wherein the persistent store is a sequential access storage device.

11. The computer system of claim 1 wherein the persistent store is a hard disk drive.

12. The computer system of claim 1 wherein the computer program product further comprises instructions to:
    apply the order activity log file in the persistent store to rebuild the order book in main memory.

13. A computer implemented method for chronicling order execution in an order book maintained in a computer system for an electronic market comprises:
    storing by the computer system received incoming orders and other commands in addition to incoming orders, referred to as activities into a matching trigger queue structure in main memory of the computer system;
    retrieving a next incoming order from the matching trigger queue and a record of an order from an order book stored in the main memory of the computer system;

matching by the computer executing a process resident in the main memory of the computer system the retrieved next incoming order and retrieved record from the order book;

recording match of the retrieved next incoming order and retrieved record from the order book in the main memory of the computer system; and recording a record of match in a persistent store of the computer system, in an order activity log file, prior to retrieving a subsequent incoming order from the matching trigger queue.

14. The method of claim 13 wherein the main memory is random access memory.

15. The method of claim 14 wherein the main memory is a cache.

16. The method of claim 13 wherein the received order or a portion of the received order is stored in the order book and in the order activity log file within a particular time period;

upon expiration of the time period, a first activity is retrieved from the matching trigger queue for processing by the matching.

17. The method of claim 16 wherein the first activity includes executing a security transaction by matching the retrieved next incoming order and retrieved record from the order book.

18. The method of claim 16 wherein the first activity includes executing supervisory command related to a security transaction.

19. The method of claim 16 wherein a state of the order book represents the market at a time of the first activity.

20. The method of claim 13 further comprising:
updating an order file stored on the persistent store with the order.

21. The method of claim 13 further comprising:
determining a status of the order, if the status of the order is open,
updating an order file stored in the persistent store with the order; if the status is closed avoid updating the order file with the order.

22. The method of claim 13 wherein the persistent store is a sequential storage device.

23. The method of claim 13 wherein the persistent store is a hard disk drive.

24. The method of claim 13 further comprising:
applying the order activity log file stored in the persistent store to rebuild the order book in main memory.

25. A computer program product tangibly stored on a computer readable storage device for chronicling a portion of an electronic market, comprises instructions for causing a computer to:

store received incoming orders and other commands in addition to incoming orders, referred to as activities into a matching trigger queue that resides in main memory of a computer system;

retrieve a next incoming order from the matching trigger queue and retrieve a record of an order from an order book stored in main memory of the computer system;

match the retrieved next incoming order and retrieved record from the order book;

record match of the retrieved next incoming order and retrieved record from the order book in the order book in the main memory of the computer system; and record the match in a persistent store in an order activity log file, prior to retrieving a subsequent incoming order from the matching trigger queue.

26. The computer program product of claim 25 wherein the main memory is random access memory.

27. The computer program product of claim 25 wherein the main memory is a cache.

28. The computer program product of claim 25 wherein the received order or a portion of the received order is stored in the order book and in the order activity log file within a particular time period and upon expiration of the time period, a first activity is retrieved from the matching trigger queue for processing by the matching.

29. The computer program product of claim 28 wherein the first activity includes instructions to execute a security transaction by matching the retrieved next incoming order and retrieved record from the order book.

30. The computer program product of claim 28 wherein the first activity includes instructions to execute a supervisory command related to a security transaction.

31. The computer program product of claim 28 wherein a state of the order book represents the market at a time of the first activity.

32. The computer program product of claim 25 further comprising instructions to:
update an order file stored in the persistent store with the order.

33. The computer program product, of claim 25 wherein further comprising instructions to:
determine a status of the order, if the status of the order is open,
update an order file stored in the persistent store with the order; if the status is closed
avoid update of the order file with the order.

34. The computer program product of claim 25 wherein the persistent store is a sequential storage device.

35. The computer program product of claim 25 wherein the persistent store is a hard disk drive.

36. The computer program product of claim 25, further comprising instructions to:
apply the order activity log file in the persistent store to rebuild the order book in main memory.

\* \* \* \* \*